United States Patent [19]

Igarashi et al.

[11] Patent Number: 4,941,181
[45] Date of Patent: Jul. 10, 1990

[54] DATA PROCESSING METHOD IN RECOGNITION SYSTEM

[75] Inventors: Kimio Igarashi, Gozen; Yasuo Uchida, Takatsuki; Kenji Matsui, Nagaokakyo, all of Japan

[73] Assignee: Omron Tateisi Electronics Co., Kyoto, Japan

[21] Appl. No.: 346,659

[22] Filed: May 2, 1989

[30] Foreign Application Priority Data

May 9, 1988 [JP] Japan .................. 63-111859

[51] Int. Cl.$^5$ .............................................. G06K 9/00
[52] U.S. Cl. ........................................... 382/1; 382/8;
364/132; 364/138; 364/474.11; 364/478
[58] Field of Search ................... 382/8, 1; 364/474.11, 364/478, 138, 132, 137; 340/505

[56] References Cited

U.S. PATENT DOCUMENTS

| | | | |
|---|---|---|---|
| 4,577,344 | 3/1986 | Warren et al. | 382/1 |
| 4,587,607 | 5/1986 | Kurakake | 364/474.11 |
| 4,731,733 | 3/1988 | Knoll | 364/132 |
| 4,827,425 | 5/1989 | Linden | 364/478 |
| 4,837,704 | 6/1989 | Lengefeld | 364/474.11 |
| 4,841,431 | 6/1989 | Takagi et al. | 364/474.11 |

Primary Examiner—Leo H. Boudreau
Assistant Examiner—Yon Jung
Attorney, Agent, or Firm—Dickstein, Shapiro & Morin

[57] ABSTRACT

A recognition system including a data carrier which is attached to a moving article and which has a memory storing identification data of the article and a control system communicating with the data carrier without any contact therebetween. The control system includes a higher-level controller, a plurality of lower-level controllers connected thereto, and read/write heads connected to the lower-level controllers. The higher-level controller sequentially sends an auto read/write command to the lower-level controllers. In response thereto, when the data carrier approaches one of the lower-level controllers, the lower-level controller communicates with the data carrier so as to access the memory thereof. The lower-level controller temporarily keeps a result of the memory access (the response from the data carrier) such that on receiving a command from the higher-level controller, the lower-level controller transmits the memory access result thus temporarily kept therein to the higher-level controller.

3 Claims, 7 Drawing Sheets

DATA PROCESSING METHOD IN RECOGNITION SYSTEM

BACKGROUND OF THE INVENTION

Field of the Invention

The present invention relates to a data processing method of an article recognition system comprising a high-level controller, lower-level controllers connected to the higher-level controller, read/write heads, and a data carrier which is to be counted on a moving article and which has a memory integrated therewith and loaded with identification data of the article.

Description of the Prior Art

For example, as an article recognition system in which an article such as a pallet transported on a conveyor is recognized without any contact thereto so as to change recognition (identification) data of the article, there has been one, as shown in FIG. 6, including a higher-level controller 1, a lower-level controller 2 connected to the higher-level controller 1, a read/write head 3 connected to the lower-level controller 2, and a data carrier 4 to be attached to a moving article (pallet) 5. The data carrier 4 includes a memory (for example, EE-PROM) integrated therewith to store recognition data such that the data write or read operation on the memory is effected by use of a communication through an electromagnetic induction between the read/write head 3 and the data carrier 4, which is controlled by the lower-level controller 2 based on a command from the higher-level controller 1.

The coperation modes of the article recognition system includes, in addition to the ordinary read and write modes (in which the higher-level controller appropriately instructs the lower-level controller to detect an approach of the data carrier to the read/write head and to effect an access to the memory of the approaching data carrier so as to conduct the read/write operations), an auto read mode and an auto write mode. In the auto read/write processing, when an auto read (or an auto write) command is once transmitted from the higher-level controller 1 to the lower-level controller 2, the lower-level controller 2 catches or detects an approach of the data carrier 4 so as to effect a read (or write) operation on the pertinent data carrier. The further detailed processing procedure of the conventional auto read (auto write) is as shown in FIG. 7. First, for example, an auto read command is sent from the higher-level controller 1 (ST71) such that on receiving the auto read command, the lower-level controller 2 transmits a status read command to the data carrier 4 (ST72). However, when the data carrier 4 is not at an approach position in a range where the read/write head 3 can effect a communication, no answer is returned from the data carrier 4. In consequence, so long as there is not received a response from the data carrier 4, the lower-level controller 2 sends thereafter a status read command at a predetermined interval (ST73, ST74). In the meantime, the data carrier 4 approaches and enters a communicable range of the read/write head 3, and the data carrier 4 sends in response to the status read command a status read response (a text including status data stored in the memory of the data carrier 4) (ST76). On receiving the reply of the status read response, the lower-level controller 2 recognizes that the data carrier 4 enters the communicable range and then sends a read command to the data carrier 4 (ST77). After receiving the read command, the data carrier 4 executes a read access to the memory and then returns a read response including data read out from the memory to the lower level controller 2 (ST78). On receiving the read response, the lower-level controller 2 sends a response including the read data to the higher-level controller 1 (ST79). Incidentally, the similar procedure is employed also in a case of the auto write.

The article recognition system above shows the most fundamental configuration including a higher-level controller, a lower-level controller, and a read/write head. However, in an actual system, there may exist a plurality of (N) lower-level controllers connected to a higher-level controller and M read/write heads connected to each lower-level controller. In such a multisystem configuration, if the processing method associated with the conventional auto read/write modes described above is adopted, the auto read/write command is sent from the higher-level controller to the plural lower-level controllers; thereafter, the higher-level controller waits for an auto read/write response sent from the lower-level controllers. Since the period of time in which the auto read/write response is transmitted from the plural lower-level controllers is not predetermined and hence cannot be determined, it is possible that there occurs a contention between auto responses from the lower-level controllers. In addition, there is a problem also in a case where the auto read (auto write) processing is achieved for a plurality of read/write heads connected to a lower-level controller, namely, there exists a fear that responses may collide with each other on a transmission path between the higher-level controller and the lower-level controllers.

SUMMARY OF THE INVENTION

The present invention is devised by paying attention to the problems above and it is therefore an object of the present invention to provide a data processing method in a recognition system in which the auto access can be simultaneously accomplished from a higher-level controller to a plurality of lower-level controllers and to a plurality of read/write heads.

According to the present invention, in the data processing method in a recognition system including a data carrier having a memory integrated therewith to store recognition data therein, said data carrier being mounted on a moving article, a higher-level controller, and a plurality of lower-level controllers each for receiving a command from the higher-level controller so as to control data access to the memory of the data carrier, and at least a read/write head connected to each said lower-level controller for effecting data communication with the data carrier approaching the read/write head, the processing is achieved such that the higher-level controller specifies the lower-level controllers in a predetermined order so as to sequentially send thereto an auto read/write command (namely, either one of an auto read command or an auto write command) and thereafter specifies the lower-level controllers in a predetermined order so as to sequentially send a sub-command thereto, that each said lower-level controller receiving the auto read/write command sent thereto repeatedly sends a command to confirm an approach of the data carrier until the approach of the data carrier is confirmed, that when the approach of the data carrier is confirmed, said lower-level controller sends a read/write command to the data carrier, and that the data carrier effects and access to the memory thereof in associated with the read/write command and then transmits an auto response related to the access to the memory to the lower-level controller, which keeps the content of the auto response such that when the sub-command with a specification of the lower-level controller is received from said higher-level controller, the lower-level controller sends the auto response containing the content thus kept therein to the higher-level controller.

In a recognition system utilizing this data processing method, an auto read/write command is sent from the higher-level controller to the plural lower-level controllers. On receiving the auto read/write command, each lower-level controller respectively sends a command to confirm an approach of the data carrier, for example, a status read command via a read/write head. The transmission of the status read command is repeated at a predetermined interval until the data carrier approaches. When the approach of the data carrier is confirmed, the lower-level controller transmits a read/write command to the data carrier through a read/write head. On receiving the read/write command, the data carrier effects a read/write access to the memory so as to return a read/write response with data related to the read/write operation to the lower-level controller. In the lower-level controller, the read/write response is temporarily retained.

On the other hand, in the higher-level controller, after the transmission of the auto read/write command, a sub-command is sent to the respective lower-level controllers in a predetermined order. Each lower-level controller, on receiving the sub-command with a specification thereof, returns an auto read/write response including the content of the read/write response thus retained to the higher-level controller if a read/write response has already been received from the data carrier, whereas if the read/write response has not been received yet, the lower-level controller returns a response indicating the condition. In this fashion, according to this data processing method of the present invention, since there is adopted a so-called polling system in which sub-command specified with the respective lower-level controllers are sequentially sent from the higher-level controller to the respective lower-level controllers, even if the approach of the data carrier to the respective controllers occurs at various timing points, the response from the lower-level controllers to the higher-level controller is achieved in a sequence of time corresponding to the sub-command, and hence there does not occur the collision between the auto responses.

According to the present invention, in a system in which a higher-level controller is connected to a plurality of lower-level controller and at least one or a plurality of read-write heads are connected to each of the lower-level controllers, a command for confirming an approach of a data carrier is repeatedly transmitted independently by each read/write head. When a response is received due to an approach of a data carrier, the lower-level controller causes the data carrier to achieve a memory access and then a response obtained therefrom is temporarily stored. The lower-level controller sends in response to a sub-command sent thereto, a response including the content temporarily stored to the higher-level controller; in consequence, there does not occur a collision between the responses of the higher-level controller and the lower-level controllers, which enables the communication to be accomplished with a high efficiency.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Next, referring to an embodiment, the present invention will be described further in detail.

Figure 2:
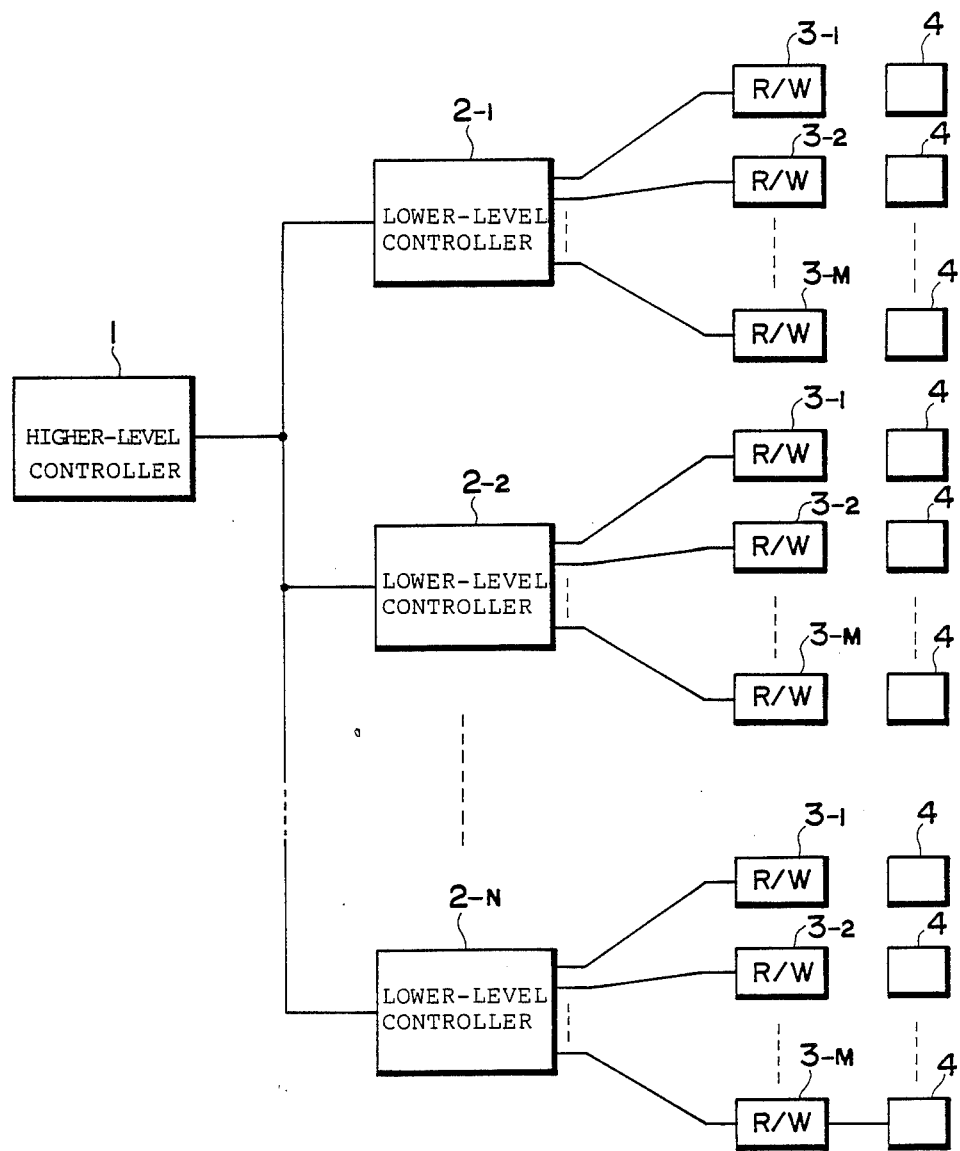
FIG. 2 is a block diagram showing an article recognition system in which the present invention is effected.

FIG. 2 is a block diagram showing an article recognition system in which the present invention is effected. In this article recognition system, to a higher-level controller 1, there are connected a plurality of (N) lower-level controllers $2_{-1}, 2_{-2}, \ldots, 2_{-N}$, and to each of the lower-level controllers $2_{-1}, 2_{-2}, \ldots, 2_{-N}$, there are respectively connected M read/write heads $3_{-1}, 3_{-2}, \ldots, 3_{-M}$ such that before these read/write heads $3_{-1}, 3_{-2}, 3_{-M}$ an arbitrary data carrier 4 passes at an arbitrary time.

Figure 3:
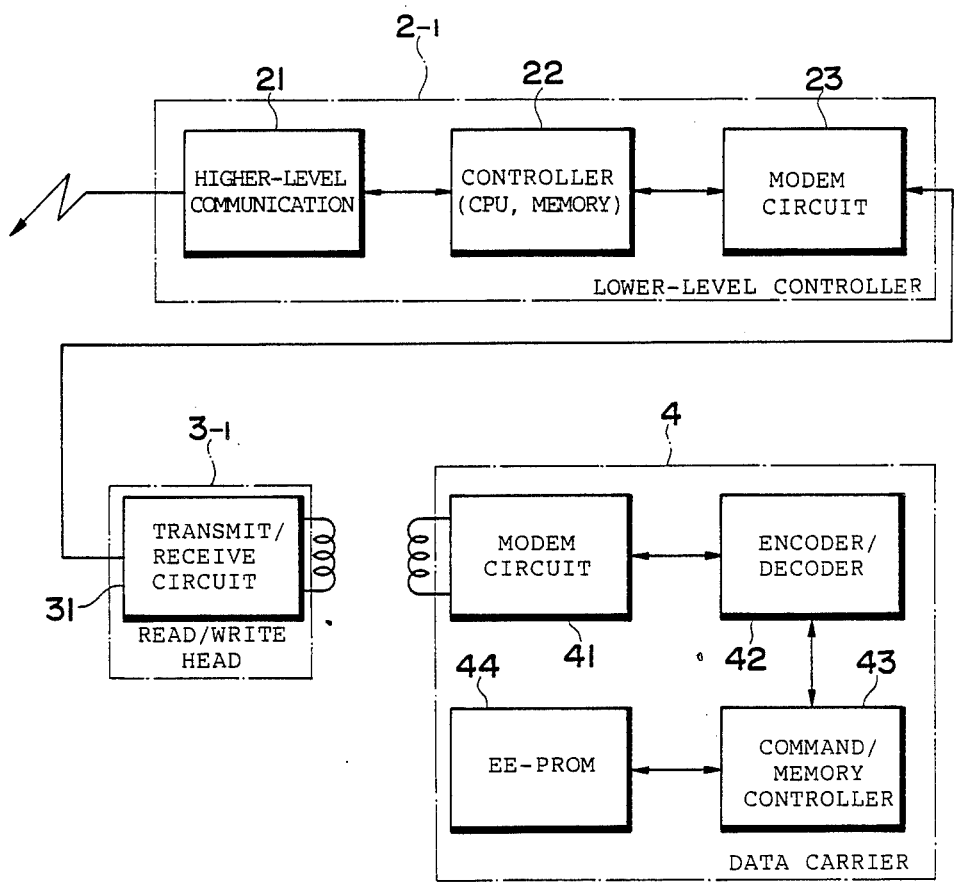
FIG. 3 is a block diagram showing a specific constitution of a lower-level controller and a data carrier in the article recognition system.

FIG. 3 shows a specific constitution of the system including the lower-level controller $2_{-1}$, the read/write head $3_{-1}$, and the data carrier 4.

The lower level-controller $2_{-1}$ includes a higher-level transmission section 21 for effecting communications with the higher-level controller 1, a control circuit 22 for controlling the communications with the data carrier 4 based on commands from the higher-level controller 1, and a modem circuit 23 for effecting communications with the data carrier 4. The control circuit 22 comprises a CPU and a memory.

The read/write head $3_{-1}$ is provided with a transmit/receive circuit 31 integrated therewith. The other controllers and read/write heads are respectively of the similar configurations.

The data carrier 4 includes a modem circuit 41 to be electromagnetically coupled with the read/write head, an encode/decode circuit 42 for decoding a carrier signal attained from the modem 41 and for encoding transmission data, a command memory controller 43 for controlling an EE-PROM 44 based on commands transmitted thereto, and the EE-PROM 44 for storing therein ID data of an article and other data. Incidentally, although an SRAM may be employed in place of the EE-PROM 44, there is required a backup battery in this case.

The characteristic of the article recognition system resides in that when an auto command specified with each controller unit number and a read/write head number is transmitted in a sequence of time from the higher-level controller 1 to the respective lower-level controllers $2_{-1}, 2_{-2}, \ldots, 2_{-N}$, and when each lower-level controller receives the auto command with a specification thereof, the lower-level controller repeatedly sends a status command via the specified read/write head until a status response is returned from the data carrier 4 at a predetermined interval. When the status response is returned from the data carrier 4, since the data carrier approaches the controller 2, a read/write command is next transmitted. Thereafter, on receiving as a reply memory access data transmitted from the data carrier, the lower-level controller 2 temporarily stores and keeps the memory access data. In addition, the article recognition system is characterized in that the higher-level controller 1 sends, after the transmission of the auto command, a sub-command specified with each controller unit number to the respective lower-level controllers $2_{-1}, 2_{-2}, \ldots, 2_{-N}$ in a sequence of time. The characteristic includes that each lower-level controller sends, on receiving the sub-command with a specification thereof when the data carrier is not at an approached position, a response indicating the condition in response thereto to the higher-level controller 1; whereas when the response (including the memory access data) is already received from the data carrier and is temporarily stored, the lower-level controller returns an auto response including the memory access data thus retained to the higher-level controller.

Figure 5:
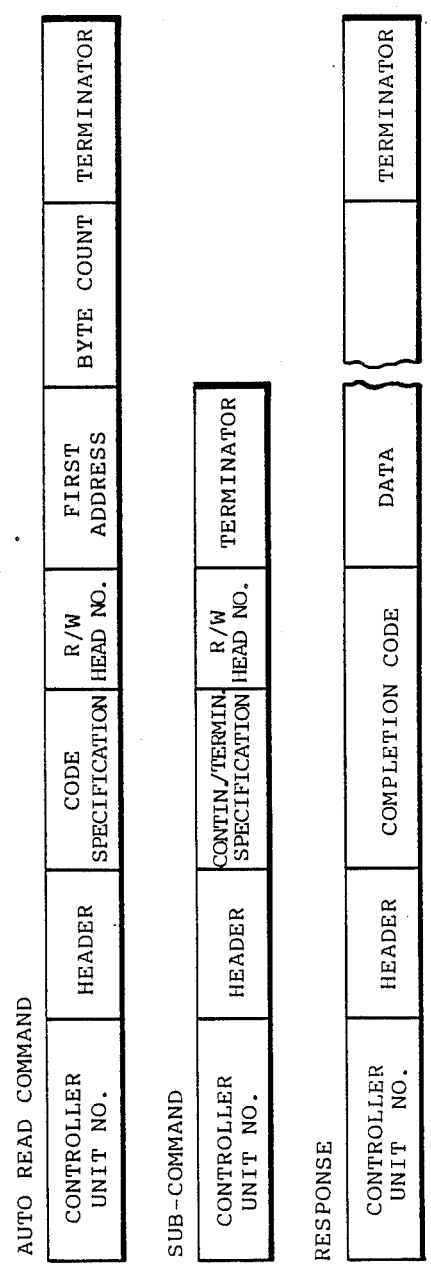
FIG. 5 is a diagram showing formats of commands and responses employed in the article recognition system.
Figure 6:
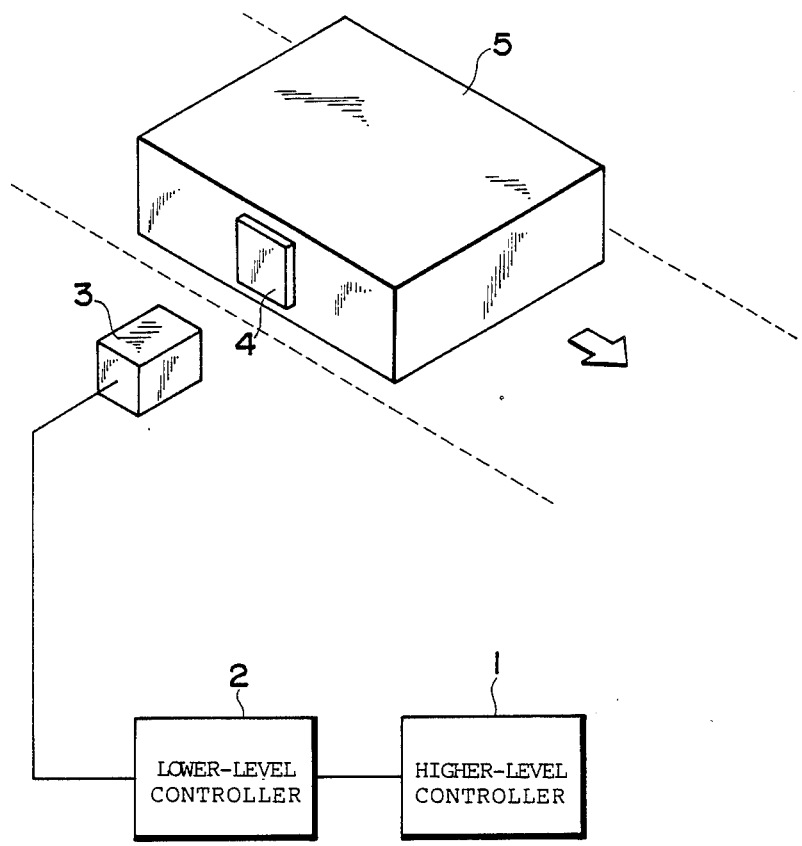
FIG. 6 is a schematic diagram useful to explain a general article recognition system of the prior art technology.
Figure 7:
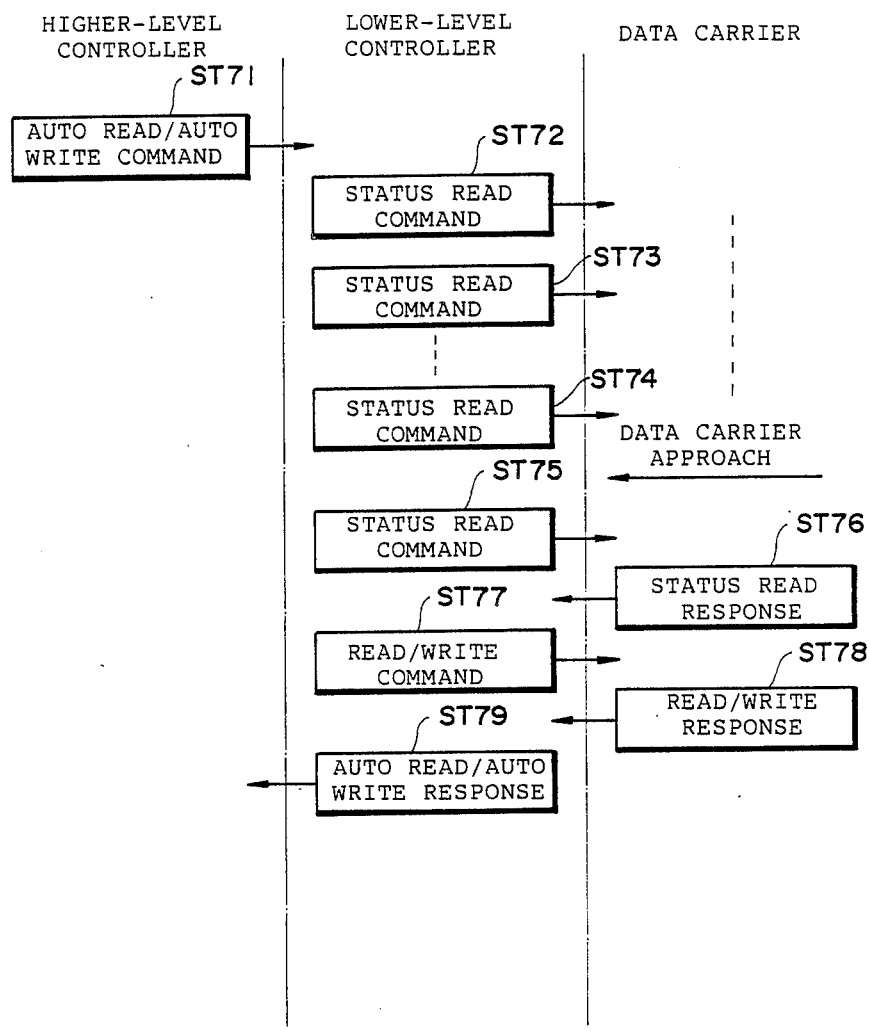
FIG. 7 is a flowchart showing the operation of a conventional example.

Next, description will be given of the operation of the article recognition system of the embodiment above. Incidentally, the formats of the auto read command, the sub-command, and the response to be used in the description below are as shown in FIG. 5 in which the auto read command includes a unit number of a specified lower-level controller, a header, a code specification indicating the ASCII or HEX system, a read/write head number, a first address to be accessed in the memory of the data carrier, a byte count, and a terminator. The sub-command includes a unit number of a specified lower-level controller, a header, a code indicating whether the polling is continued or interrupted, a read/-write header number, and a terminator. The auto read response comprises a unit number of a lower-level controller, a header, a termination code, read data, and a terminator. The termination code here is a code indicating a classification, namely, that the normal completion is detected, that the data carrier does approaches, that the initial polling auto command is received, or that the polling auto command processing is interrupted.

Figure 1:
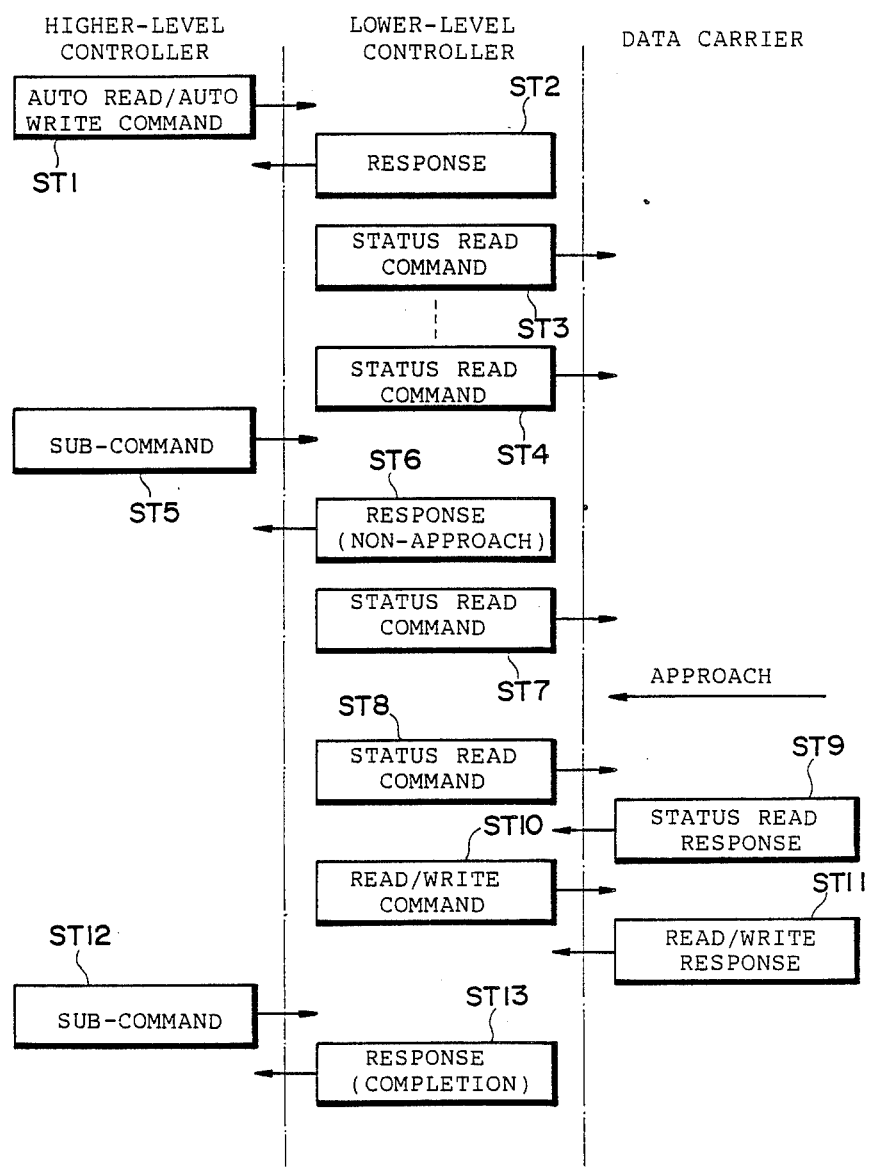
FIG. 1 is a flowchart useful to explain an operation of communications between a higher-level controller and a lower-level controller for explaining the fundamental operation of an article recognition system as an embodiment according to the present invention.

Referring here the flowchart of FIG. 1, descritpion will be given of the communication as a fundamental operation between the higher-level controller and a lower level controller.

First, an auto read/write command (either one of an auto read command and an auto write command) is sent from the higher-level controller 1 (ST1). On receiving the auto command, the lower-level controller 2 returns a response indicating the reception of the command to the higher-level controller 1 (ST2) and then sends a status read command via a specified read/write head 3 to the data carrier 4 (ST3). In a case where the data carrier 4 is not at an approach position within the communicable range of the specified read/write head 3, the data carrier 4 does not return the response. While the response is not returned, the lower-level controller 2 repeatedly effects a transmission of the status read command at a constant interval (ST3, ST4).

On the other hand, the higher-level controller 1 sends, on receiving the response in reply to the auto command, after a predetermined period of time a sub-command to the lower-level controller 2 (ST5). The lower-level controller 2 having received the sub-command sends, in a case where no response is returned from the data carrier 4 in response to the status read command previously transmitted, namely, in a case where the data carrier does not approach the controller, a response indicating the condition to the higher-level controller 1 (ST6).

In the meantime, when the data carrier 4 approaches, in response to the next status read command (ST8) sent from the lower-level controller 2, the data carrier 4 returns a status read response (ST9). When the status read response is received, the lower-level controller 2 sends a read command to the data carrier 4 (ST10). The data carrier 4 having received the read command conducts a read access to the memory (EE-PROM) and then returns a read response together with the data read out to the lower-level controller 2 (ST11). The lower-level controller 2 does not immediately return the read response and temporarily stores the response in the memory of the controll circuit 22. Thereafter, when the next sub-command is sent from the higher-level controller 1 to the lower-level controller 2 (ST12), the lower-level controller 2 sends a response of completion, namely, a auto read response including read data temporarily stored in the memory of the control circuit 22 in response thereto to the higher-level controller 1 (ST13). Incidentally, the case of the auto write command is basically the same as the case of the auto read command.

As described above, in each lower-level controller 2, when an auto read command from the higher-level controller 1 is received, a status read command is sent therefrom to the data carrier 4 at a predetermined interval such that when a status read response is returned from the data carrier 4, a read command is transmitted to the data carrier 4, and thereafter when a read response is returned from the data carrier 4, the read response is temporarily stored therein until a sub-command is transmitted from the higher-level controller 1; and then in response to the sub-command from the higher-level controller 1, the lower-level controller 2 returns a response of completion including the read response which is returned from the data carrier 4 and which is temporarily stored in the memory.

Figure 4:
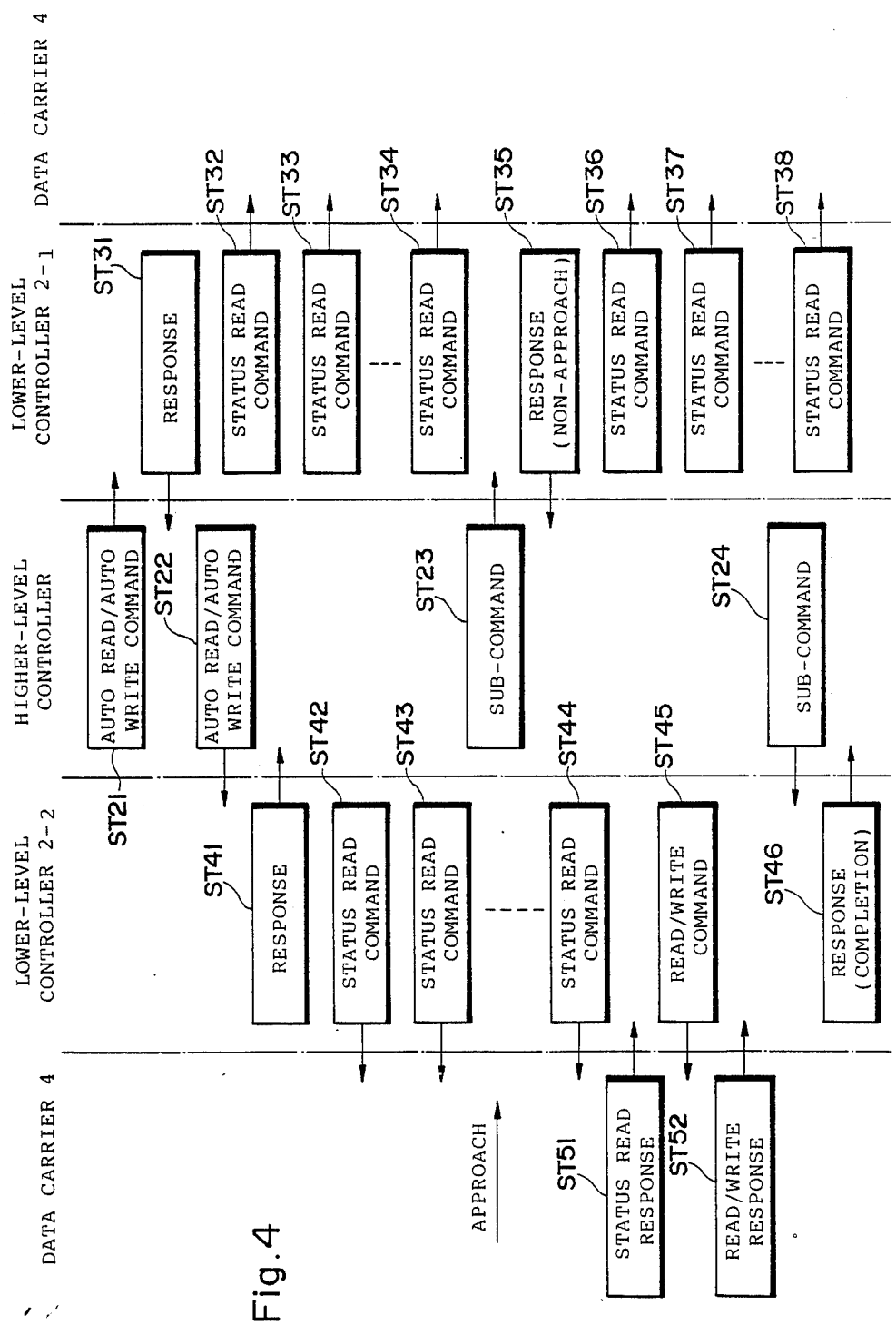
FIG. 4 is a flowchart useful to explain an operation of the article recognition system.

Next, the communication between a higher-level controller 1 and a plurality of lower-level controllers will be described by referring to the flowchart of FIG. 4. Incidentally, in FIG. 4, there is shown a communication example between a higher-level controller 1 and the first and second lower-level controllers $2_{-1}$ and $2_{-2}$.

First, the higher-level controller 1 sends, for example, an auto read command with a specification of the first lower-level controller $2_{-1}$ (ST21). This auto read command also includes a specification indicating one of the read/write head (example: $3_{-1}$) connected to the lower-level controller $2_{-1}$. On receiving the auto read command, the first lower-level controller $2_{-1}$ returns a response of the reception (ST31). After receiving the response, the higher-level controller 1 sends an auto read command to the second lower-level controller 2_2(ST22), which then returns a response thereto (ST41). Subsequently, in the similar fashion, the higher-level controller 1 generally transmits an auto command to a plurality of lower-level controllers. When the transmission of the auto read command to each lower-level controller is finished, subsequently, the higher-level controller 1 sequentially sends a sub-command to the lower-level controllers at a predetermined intervals (ST23, ST24, ... ).

On receiving an auto read command, the lower-level controllers 2_1, 2_2, etc. repeat the transmission of a status read command via the specified read/write heads until a response is received from the data carrier 4 (ST31 to ST34; ST41 to ST44).

The lower-level controller 2_1 sends, if a response is not accepted from the data carrier 4, namely, if the data carrier is not at an approach position, when the sub-command thereto is received (ST23), a response indicating the condition to the higher-level controller 1 (ST35); thereafter, until the data carrier 4 becomes to an approach position, the transmission of the status command is repeated (ST36 to ST38).

On the other hand, during the transmission of the status read command at a predetermined interval from the respective lower-level controllers 2_1, 2_2, etc., if a data carrier 4 approaches the read/write head 3_2 connected, for example, to the lower-level controller 2_2, the data carrier 4 receives a status read command from the lower-level controller 2_2 and then returns a status read response to the lower-level controller 2_2 (ST51). When the status read response is received, the lower-level controller 2_2 sends a read command via the specified read/write head 3_2 (ST45). On receiving the read command, the data carrier 4 effects a read access to the own memory (EE-PROM) 44 and then returns a read response together with the data read out to the lower-level controller 2_2 (ST52). The lower-level controller 2_2 temporarily stores the response thus transferred thereto, and thereafter, when a sub-command sent thereto from the higher-level controller 1 is received (ST24), a response of completion, namely, an auto read response is sent in response thereto to the higher-level controller 1.

Incidentally, in the example shown here, there has been described a case where for the lower-level controllers 2_1 and 2_2, the data carrier first approaches the read/write head 3_2 of the lower-level controller 2_2; however, the similar operation is effected also in a case where the data carrier first approaches the other lower-level controller or the other read/write head. The lower-level controller controlling the read/write head for which the approach of the data carrier is detected temporarily stores a read response (or a write response) such that when a sub-command sent thereto is received, the lower-level controller transmits a response in reply thereto to the higher-level controller.

As described above, since each lower-level controller sends, when a sub-command with a specification thereof is received, a response to the higher-level controller, there does not occur a collision of the responses in a communication path between the higher-level controller and a plurality of lower-level controllers.

While particular embodiments of the present invention have been shown and described, it will be obvious to those skilled in the art that various changes and modifications may be made without departing from the present invention in its broader aspects.

What is claimed is:

1. A data processing method in a recognition system including a data carrier having a memory integrated therewith to store identification data therein, said data carrier being mounted on a moving article, a higher-level controller, a plurality of lower-level controllers connected to the higher-level controller each for receiving a command from the higher-level controller so as to control data access to the memory of the data carrier, and at least a read/write head connected to each said lower-level controller for effecting data communication with the data carrier approaching the read/write head characterized in that:
   the higher-level controller specifies the lower-level controllers in a predetermined order so as to sequentially send thereto an auto read/write command and thereafter specifies the lower-level controllers in a predetermined order so as to sequentially send a sub-command thereto;
   that each said lower-level controller receiving the auto read/write command with a specification thereto repeatedly sends a command to confirm an approach of the data carrier until the approach of the data carrier is confirmed such that when the approach of the data carrier is confirmed, said lower-level controller sends the auto read/write command;
   that the data carrier effects an access to a memory in response to the auto read/write command thus received so as to transmit an auto response related to the access to the memory to the lower-level controller; and
   that the lower-level controller keeps the content of the auto response such that when the sub-command with a specification thereof from the higher-level controller is received, the lower-level controller sends the auto response including the content thus kept to the higher-level controller.

2. A recognition system comprising:
   a data carrier which is attached to a moving article and which has a memory for storing therein data including identification data related to the article; and
   a control system for effecting an operation to write data in the memory of the data carrier or to read data therein wherein
   said control system includes a higher-level controller, a plurality of lower-level controllers communicable with the higher-level controller, and read/write heads at least one of which is connected to each of the lower-level controllers so as to effect data communication with a data carrier,
   said data carrier effects, when a read/write command is received, an access to the memory so as to achieve read/write processing associated therewith in response to the command, thereby outputting a response including a result of the read/write processing.
   said higher-level controller sequentially outputs auto read/write command with a specification of a lower-level controller to the plural lower-level controllers and thereafter sequentially transmits a sub-command with a specification of a lower-level controller specified by the auto read/write command, each said lower-level controller repeatedly outputs, when the auto read/write command specifies the lower-level controller, a command to confirm an approach of a data carrier via a read/write head associated therewith such that when the arroach of the data carrier is confirmed, the lower-level controller sends a read/write command via the read/write head to the data carrier and when a response is returned from the data carrier in response to the read/write command, the lower-level controller temporarily keeps a content of the received response such that when a sub-command with a specification thereof from the higher-level controller is received, the lower-level controller sends to the higher-level controller an auto response which includes the content of the response from the data carrier and which is kept therein.

3. A recognition system according to claim 2 wherein each said lower-level controller repeatedly outputs, when the auto read-write command specifies the lower-level controller, a status read command at a predetermined interval via a read/write head associated therewith such that on receiving a status read response returned from the data carrier in response to the command, the lower-level controller confirms the approach of the data carrier.

* * * * *